United States Patent Office 3,418,377
Patented Dec. 24, 1968

3,418,377
DIPHENYL ETHER POLYOLS
Walter B. Trapp, Midland, Mich., assignor to The Dow Chemical Company, Midland, Mich., a corporation of Delaware
No Drawing. Continuation-in-part of application Ser. No. 238,788, Nov. 19, 1962. This application Mar. 15, 1965, Ser. No. 440,010
3 Claims. (Cl. 260—613)

This application is a continuation-in-part of pending U.S. patent application S.N. 238,788, filed Nov. 19, 1962, by Walter B. Trapp and now abandoned which was in turn a continuation-in-part of copending U.S. patent applications S.N. 95,016 and 95,017, filed Mar. 13, 1961, by Walter B. Trapp and now abandoned.

This invention relates to new polyols and more particularly to new polyols derived from diphenyl ethers. Still more particularly, it relates to novel polyols containing a single diphenyl ether moiety and corresponding to the formula:

[ArOAr]—[CH$_2$—(OC$_a$H$_{2a}$)$_m$OH]$_n$

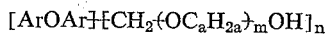

wherein Ar is a phenyl group, each $a$ is an integer from 2–4, each $m$ is an integer from 1–40, $n$ is an integer from 1–4, and the substituent hydroxy ether groups are limited to the 2- and 4-positions of each phenyl group.

Illustrative of the invention are such compounds as 4,4′-bis(2-hydroxyethoxymethyl)diphenyl ether, 2,4,4′-tris(2-hydroxypropoxymethyl)diphenyl ether, 4,4′-bis(2-hydroxyethoxyethoxyethoxymethyl)diphenyl ether and 2,2′,4,4′-tetrakis(2-hydroxyethoxymethyl)diphenyl ether as well as mixtures of these and other similar polyols with even longer polyoxyalkylene substituent groups.

These polyols are generally viscous oils or low melting solids with a molecular weight in the range from 240 to 4,000 or more. Depending upon such factors as the length and structure of the polyoxyalkylene substituents, water-soluble polyols can be prepared for use as surfactants or thickeners in aqueous solutions. Polyols which are water-insoluble but soluble in organic solvents such as acetone, dioxane, lower alcohols and dimethyl formamide, can also be prepared. These polyols are further characterized by low volatility and high thermal stability.

It is particularly beneficial to employ these products as intermediates in the synthesis of polyesters and polyurethanes. For example, all these polyols can be used in conventional urethane formulations whereby reaction with a polyisocyanate such as tolylene diisocyanate, the diphenyl ether moiety is incorporated in the polyurethane structure. This presence of the diphenyl ether moiety in the urethane polymer imparts improved water resistance and low temperature flexibility to the polyurethane. Furthermore, many polyols within the scope of the present invention are superior column liquids or substrates in gas-liquid chromatography particularly at elevated temperatures. Still other of these novel polyols have unexpected utility as insecticides and fungicides and are readily adapted for use as the toxic constituent of compositions for the control of insect and fungi in agronomic practice.

The novel polyols of the present invention are conveniently prepared from halomethylated diphenyl ethers containing from 1 to 4 halomethyl groups per diphenyl ether moiety. These intermediates are readily obtained by chloromethylation or bromomethylation of diphenyl ether or an alkyl or halo-substituted diphenyl ether as described in greater detail by Doedens in U.S. Patent 2,911,380. Particularly suitable are such chloromethyldiphenyl ethers as 2- and 4-chloromethyldiphenyl ether, 2,4′- and 4,4′-bis(chloromethyldiphenyl)ether, 2,4,4′-tris(chloromethyldiphenyl)ether and 2,2′-4,4′-tetrakis(chloromethyldiphenyl)ether. Other halomethyldiphenyl ethers which can be employed in the synthesis of the polyols described herein include 4-bromomethyldiphenyl ether, 4,4′-bis(bromomethyl)diphenyl ether, 4-chloromethylditolyl ether, 4,4′-bis(chloromethyl)ditolyl ether, 4,4′-bis(chloromethyl)-2,2′-bis(ethyl)diphenyl ether, 2-chloro-4,4′-bis(chloromethyl)diphenyl ether, etc.

As noted by Doedens in U.S. Patent 2,911,380 and by Doedens and Rosenbrock in U.S. Patent 3,047,518 halomethylation of diphenyl ether generally results in a mixture containing an average of up to 4 halomethyl groups per diphenyl ether molecule. Since diphenyl ether undergoes electrophilic substitution preferably at the positions ortho and para to the ether oxygen, the halomethyl groups are located predominately in the 2-, 2′-, 4-, and 4′-positions. Once halomethylation occurs at the 2- and 2′-positions, reaction at the other ortho positions is sterically hindered. Thus introduction of more than 4 halomethyl groups is difficult.

The exact composition of a halomethylation product depends upon the reaction conditions and particularly on the proportion of halomethylating agent employed. Several typical chloromethyldiphenyl ether (CMDPE) compositions are given in Table 1. Such compositions are often conveniently characterized by the weight percent reactive chlorine, e.g. CMDPE–25, CMDPE–34, etc.

TABLE I.—TYPICAL CHLOROMETHYLDIPHENYL ETHER (CMDPE) COMPOSITIONS

| | | | | | | |
|---|---|---|---|---|---|---|
| Wt. percent Cl | 17.6 | 22.0 | 25.2 | 28.0 | 33.7 | 35.1 |
| Mole Ratio:ClCH$_2$/DPE | 1.10 | 1.55 | 1.85 | 2.20 | 3.00 | 3.30 |
| Composition (mole percent): | | | | | | |
| Diphenyl ether (DPE) | 17.3 | 13.8 | 0 | 0 | 0 | 0 |
| 2-chloromethyl DPE | 5.3 | 3.3 | 0.3 | 0 | 0 | 0 |
| 4-chloromethyl DPE | 42.9 | 24.9 | 2.4 | 1.5 | 0 | 0 |
| 2,4′-bis(chloromethyl) DPE | 10.8 | 15.2 | 17.7 | 17.7 | 0.1 | 0 |
| 4,4′-bis(chloromethyl) DPE | 20.6 | 35.5 | 68.5 | 50.2 | 9.3 | 1 |
| Tris (chloromethyl) DPE [1] | 2.3 | 5.1 | 10.5 | 26.7 | 68.4 | 55.5 |
| Tetrakis(chloromethyl) DPE [2] | <1.0 | 1.0 | <1.0 | 1.6 | 21.9 | 43.0 |

[1] Predominately 2,4,4′-tris(chloromethyl) DPE, M.P. 57–8° C. with small amount of 2,2′,4-tris(chloromethyl) DPE.
[2] 2,2′,4,4′-Tetrakis(chloromethyl) DPE, M.P. 78–81°, C.

The individual components of these halomethylation mixtures can be separated and purified by distillation, fractional crystallization and other conventional means. The resulting mono-, bis-, tris- and tetrakis-derivatives can be used individually in the preparation of the present diphenyl ether polyols. However, a halomethylation mixture containing an average of from about 1 to 4 halomethyl groups per diphenyl ether molecule is often advantageously used in the preparation of these polyols. In many applications the resulting mixture of polyol derivatives is quite suitable.

At times it is desirable to prepare these diphenyl ether derivatives from a hydroxymethyldiphenyl ether. Such hydroxymethyldiphenyl ethers can be prepared by hydrolysis of the corresponding halomethyldiphenyl ether as described by Trapp and Doedens in U.S. Patent 3,100,796 or by Paige et al. in British Patent 835,823. The composition of the hydrolysis product is analogous to that of the initial halomethyldiphenyl ether. For example, hydrolysis of 4,4′-di(chloromethyl)diphenyl ether gives high yields of 4,4'-di(hydroxymethyl)diphenyl ether. Here also, product mixtures with an average of from about 1 to 4 hydroxymethyl groups per diphenyl ether moiety are often advantageously employed as starting materials.

The novel diphenyl ether polyols described herein are prepared from halomethyl- and hydroxymethyldiphenyl ethers by conventional synthetic methods. For the preparation of a polyol having a single diphenyl ether moiety and a molecular weight in the range from about 240 to 1,000, the reaction of halomethyldiphenyl ether (I, X=Cl, Br) with $C_2$–$C_4$ alkylene or polyoxyalkylene glycol (II) is particularly satisfactory, e.g.

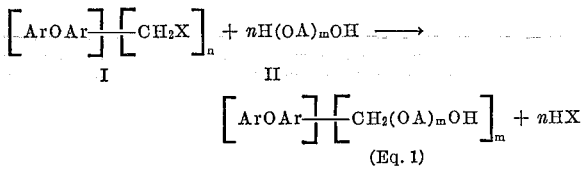

By using pure reactants such as 4,4'-di(chloromethyl)diphenyl ether and an excess of ethylene glycol, or diethylene glycol, high yields of new polyols such as 4,4'-di(2-hydroxyethoxymethyl)diphenyl ether and 4,4' - di(2-hydroxyethoxyethoxyethoxymethyl)diphenyl ether can be obtained. Mixed polyols also can be prepared by this process using a mixed halomethyldiphenyl ether and one or more glycols.

The process shown in Equation 1 is however limited by the necessity for using a large excess of glycol to obtain optimum yields of the desired polyols. Unless at least a 5-fold excess of glycol is used, based on the mole ratio of hydroxyl to halomethyl groups, side reactions decrease both product yield and purity. In general a 10-fold excess of glycol is preferred. Even larger amounts may be desirable in some instances.

Since excess glycol must be removed in purifying the product, this process is most satisfactory with glycols having a molecular weight of less than 200. The boiling points of such glycols are low enough to permit ready removal and recovery by distillation. Particularly suitable for use in this process are ethylene glycol, diethylene glycol, tetraethylene glycol, propylene glycol, dipropylene glycol, 1,2-, 1,3-, 1,4-butylene glycols and the like.

In practice, a mixture of halomethyldiphenyl ether and excess alkylene or polyalkylene glycol is heated at a temperature from about 50 to 110° C. for a time ranging from a few minutes to about four hours depending upon the reaction temperature and ratio of reactants. By-product hydrogen halide is neutralized with a base such as sodium hydroxide, sodium carbonate or potassium bicarbonate. After the reaction is completed, the product is purified by washing or filtering to remove insoluble material and then the excess glycol and other volatile impurities are stripped by distillation at reduced pressure.

Higher molecular weight polyol derivatives of diphenyl ethers are often more conveniently prepared by reaction of the appropriate hydroxymethyldiphenyl ether (III) with a 1,2-($C_2$–$C_4$) alkylene oxide (IV) as shown in Equation 2.

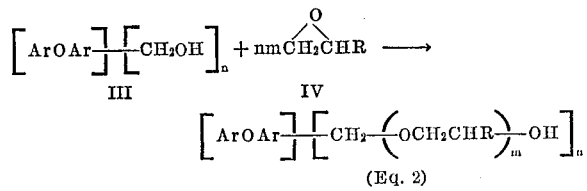

This condensation is normally catalyzed by a small amount of base such as sodium hydroxide, potassium hydroxide, and the like. Ethylene and propylene oxide are particularly suitable reactants. By using a mixture of several alkylene oxides, heteric, polyols can be prepared. Block polyoxyalkylene groups can be obtained by intermittent addition of different oxides.

Depending upon the amount of alkylene oxide employed, the polyols prepared by the process shown in Equation 2 may have hydroxyether groups containing from 1 to 40 or more oxyalkylene units and average molecular weights in the range from about 240 to 4,000 or more. Although pure polyols can be separated from the alkylene oxide addition products, this process is more satisfactory when the product mixture can be used.

In practice, addition of the $C_2$–$C_4$ alkylene oxide to the hydroxymethyldiphenyl ether is carried out in a reactor at a temperature of about 125° to 160° C. in the presence of from 0.03 to 1.00 weight percent alkaline catalyst based on total alkylene oxide. Since the reaction is exothermic, cooling is usually required to hold the temperature within the desired limits. Normally the alkylene oxide is added in small portions to maintain a pressure up to about 20 atmospheres in the reactor. When the desired addition is completed, the product is cooled, and the catalyst neutralized. Traces of water and volatile by-products are stripped by heating the product in vacuo. Finally any suspended solids are removed by filtration.

Still other synthetic methods applicable to the preparation of the polyols described herein will be evident to those skilled in the art. But in order that the invention may be more fully understood, the following examples are given by way of illustration without limitation of the invention thereto. Unless otherwise indicated, all parts and percentages are by weight, and the molecular weights of the polyols are based on hydroxyl analyses.

Example I.—Condensation of chloromethyldiphenyl ethers with excess glycol

A. To a mixture of 124 parts (2.0 moles) of ethylene glycol and 16 parts of NaOH dissolved in 25 parts of dioxane, was added 53 parts (0.20 mole) of 4,4'-di-chloromethyl)diphenyl ether. The mixture was heated with stirring at about 95° C. for one hour and then cooled to room temperature. After filtering to remove the precipitated sodium chloride, the product was heated in vacuum to remove the dioxane and unreacted ethylene glycol. There was obtained about 60 parts of 4,4'-di(2-hydroxyethoxymethyl)diphenyl ether, a waxy white solid, insoluble in water but soluble in common organic solvents. The product had a molecular weight of 318 in agreement with the theoretical value.

B. In a manner substantially identical to that of Example IA, various other compositions were prepared from 4,4'-di(chloromethyl)diphenyl ether with $C_2$–$C_4$ alkylene and polyalkylene glycols. The physical properties of a number of such compositions are given in the following table.

TABLE II.—POLYOL COMPOSITIONS

| Product | Glycol | Product Characteristics | $n_D^{25}$ | M.W. Calc. | M.W. Found |
|---|---|---|---|---|---|
| B-1 | Diethylene glycol | Waxy, White Solid | 1.547 | 406 | 390 |
| B-2 | Tetraethylene glycol | do | 1.523 | 582 | 518 |
| B-3 | Propylene glycol | do | 1.560 | 346 | 346 |

Example II.—Condensation of mixed chloromethyl-diphenyl ethers with excess glycol A. To a solution of 82 parts (2.05 moles) sodium hydroxide in 620 parts (10 moles) of ethylene glycol at 100–105° C. was added over about 60 min. 210 parts (0.67 mole) of a mixed chloromethyldiphenyl ether containing an average of 3.0 ClCH$_2$/DPE (33.7 wt. percent Cl) with the isomeric composition given in Table I. The reaction mixture was stirred another hr. at 100°–105° C., neutralized to pH 7.0 with conc. hydrochloric acid and then stripped at 160°–180° C./15 mm. Hg for 0.5 hr. to remove excess glycol. After filtering to remove traces of insoluble material, 251 parts of a clear, light amber, viscous product was obtained. The product contained 12.16 wt. percent OH (theor. 12.93 percent) and had a Brookfield viscosity of 24.800 cps. at 25° C.

B. To a solution of 210 parts (5.25 moles) sodium hydroxide in 3350 parts (25 moles) of propylene glycol at 100–105° C. was added in about 80 min. 525 parts (1.67 mole) of the same mixed chloromethyldiphenyl ether.

parts of a yellow oil having a viscosity similar to that of glycerine and a refractive index ($n_D^{25}$) of 1.4948. The molecular weight was 734 based on OH analysis and 725 by an ebullioscopic determination.

C. Many other polyols are readily prepared in a similar manner by the addition of $C_2$–$C_4$ alkylene oxides to pure or mixed hydroxymethyldiaryl ethers. By using two or more alkylene oxides, heteric and block polyols are easily obtained. Properties of several other typical polyols are given in Table III.

TABLE III.—POLYOLS FROM 4,4'-DI(HYDROXYMETHYL)DIPHENYL ETHER

| Oxide [1] | Product | $n_D^{25}$ | M.W. |
|---|---|---|---|
| EO | Brown viscous liquid | 1.519 | 630 |
| EO | Light brown grease | 1.492 | 1,230 |
| EO | Tan amorphous powder (M.P. 40–50° C.) | | 3,400 |
| PO | Pale yellow oil | 1.494 | 728 |
| PO | do | 1.476 | 1,070 |
| EO+PO [2] | Brown viscous liquid | 1.482 | 1,450 |

[1] EO=ethylene oxide; PO=propylene oxide.
[2] Equimolar mixture.

The mixture was heated for 0.5 hr. at 100°–105° C. after complete reaction, neutralized and stripped at 170° C./20 mm. Hg. The clear light amber product contained 11.67 wt. percent OH (theor. 11.68 percent) and had a Brookfield viscosity of 29,000 cps. at 25° C.

C. In a similar manner condensation of a chloromethyldiphenyl ether containing an average of about 1.85 ClCH$_2$/DPE (25.2 wt. percent Cl) with excess ethylene glycol gave a poly(2-hydroxyethyleneoxymethyl)diphenyl ether containing 8.74 wt. percent OH.

D. Still other polyols can be prepared from chloromethyldiphenyl ethers having an average of 1.0–4.0 ClCH$_2$/DPE in a similar manner using other $C_2$–$C_4$ alkylene and polyalkylene glycols.

Example III.—Condensation of alkylene oxides with hydroxymethyldiphenyl ethers

A. A pressure vessel was charged with 200 parts (0.87 mole) of 4,4'-di(hydroxymethyl)diphenyl ether and 3 parts of powdered KOH. The mixture was stirred and heated to about 125° C. and then ethylene oxide was introduced into the vessel through a dip pipe. By appropriate control of the water flow in the cooling coil and the rate of the ethylene oxide addition, the temperature was maintained in the range of 135 to 140° C. with a reaction pressure of about 3 to 15 atmospheres. A total of 1,148 parts (26 moles) of ethylene oxide was added over a period of 1.5 hours. After heating the reaction mixture at about 135° C. for an additional hour, the mixture was cooled to about 50° C. and neutralized with gaseous carbon dioxide. The product was then heated in vacuo to a final temperature of 110° C. at 0.5 mm. Hg to remove traces of water and volatile by-products. Finally, the product was filtered at about 50° C. to remove traces of solid impurities. There was obtained 1,210 parts of a brown colored product which solidified on cooling to room temperature. The solid product was water soluble with a softening point of about 32 to 37° C. and a molecular weight of 1,620.

B. A chloromethylation product containing 25.2 wt. percent Cl and having the composition shown in Table I was hydrolyzed to give a hydroxymethyldipenyl ether containing an average of 1.85 hydroxymethyl groups per diphenyl ether moiety. Then, 813 parts (14 moles) of propylene oxide was condensed with 350 parts (1.55 moles) of this hydroxymethyldiphenyl ether in the presence of 6 parts of powdered potassium hydroxide substantially as described in Example IIIA. The crude product (1,121 parts) was neutralized, washed with water, dried by heating to 110° C. at 1.5 mm. Hg, and filtered to give 960

Example IV.—Parasiticides

The product of the present invention are useful as parasiticides for the control of pests such as mites, aphids, beetles and worms. In such uses the products can be dispersed in a conventional manner such as by dusting or spraying. Also, they may be employed in solvent solution, oil-in-water or water-in-oil emulsions or aqueous dispersions.

A. A solution containing 2,400 p.p.m. of 4,4'-di(2-hydroxyethoxymethyl)diphenyl ether dispersed in water gave one hundred percent kill of two-spotted spider mites infecting cranberry bean plants.

B. In another representative operation, 0.12 wt. percent of the ethylene oxide polyol described in Example IIIA (M.W. 1,620) was added to a balanced commercial laboratory animal diet. Feeding an unrestricted quantity of this modified diet for a period of 7 days to mice parasitized by *Ascaris lumbricoides suum* gave a 100 percent kill of the parasites without evident injury to the mice.

Example V.—Substrate for gas-liquid chromatography

Several polyols were evaluated as liquid substrates for use in gas-liquid chromatography by coating on 30/60 mesh diatomaceous earth at 15% by weight using methylene chloride as a solvent. Test columns were prepared by packing the coated support in 6-foot lengths of ¼-inch stainless steel tubing followed by conditioning at 180° C. for 18 hours with a helium flow of 70 ml./min. prior to use with the following standard test mixtures:

Test Mixture 1: 9 $C_6$–$C_8$ hydrocarbons;
Test Mixture 2: 5 $C_8$–$C_9$ hydrocarbons;
Test Mixture 3: 4 $C_1$–$C_4$ alcohols;
Test Mixture 4: 7 chlorobenzenes with 1–4 Cl atoms.

A column temperature of 100° C. was used for Test Mixtures 1–3 and 170° C. for Test Mixture 4.

A. A column prepared using 4,4'-di-(2-hydroxyethoxyethoxymethyl)diphenyl ether (Example I, compound B–1) as a substrate separated 8 of the 9 components of Test Mixture 1 and all components of Test Mixtures 2 and 4. It gave a particularly sharp resolution of the aromatic constituents. No separation was obtained with the alcohol mixture.

B. A column prepared using the propylene oxide adduct described in Example IIIB also separated 8 of the 9 components of Test Mixture 1 and all components of Test Mixtures 2 and 4. However, it had greater resolution for the aliphatic hydrocarbons than the column described in A. It failed to separate the alcohol mixture.

C. Other polyols of the type described herein also show similar superior utility as substrates for gas-liquid chromatography particularly for analysis of aliphatic and aromatic hydrocarbons and their halogenated derivatives. These substrates may also be used advantageously in capillary columns.

Example VI.—Polyester resin

An unsaturated polyester was prepared by mixing 388 parts (1.0 mole, OH basis) of the diphenyl ether polyol described in Example IIC with 104.2 parts (0.9 mole) of fumaric acid and esterifying by heating successively 1 hr. at 100° C., 1.33 hr. at 130° C., 0.5 hr. while increasing from 130° C. to 200° C. and then 3.0 hrs. at 200° C. to yield an unsaturated polyester having an acid number of 19.0. During the esterification 27.0 parts of water was collected.

A sample of the unsaturated polyester was diluted with 30 percent by weight styrene. Then 250 p.p.m. t-butylcatechol inhibitor and 1 weight percent benzoyl peroxide were added and the standard SPI 180° F. gel test was run. The gel time was 4.56 min. with a cure time of 7.35 min. and a peak exotherm of 150° C.

I claim:
1. A composition of the formula:

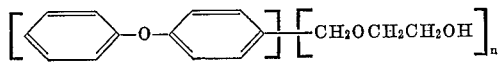

wherein $n$ is an integer from 1–4 and the substituent hydroxyether groups are limited to the 2- and 4-positions of each phenyl group.

2. 4,4'-di(2-hydroxyethoxymethyl)diphenyl ether.
3. 4,4' - di(2 - hydroxyethoxyethoxymethyl) diphenyl ether.

References Cited

UNITED STATES PATENTS 3,234,182  2/1966  Seeburger et al. _____ 260—47
2,991,313  7/1961  Bongard et al. _____ 260—613

BERNARD HELFIN, *Primary Examiner.*

U.S. Cl. X.R.

252—351, 364; 260—75, 77.5; 167—30